Dec. 31, 1940.   R. C. BENNER ET AL   2,226,701
REFRACTORY ARTICLE AND WALL
Filed Dec. 19, 1935
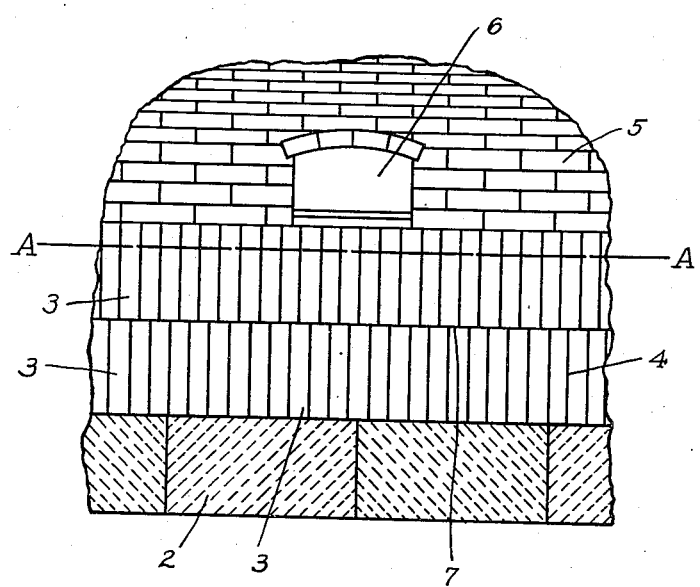
INVENTORS.
RAYMOND C. BENNER
JOHN CHARLES McMULLEN
BY
RCBenner.
ATTORNEY.

Patented Dec. 31, 1940

2,226,701

UNITED STATES PATENT OFFICE 2,226,701

REFRACTORY ARTICLE AND WALL

Raymond C. Benner and John Charles McMullen, Niagara Falls, N. Y., assignors, by mesne assignments, to The Carborundum Company, Niagara Falls, N. Y., a corporation of Delaware Application December 19, 1935, Serial No. 55,196

6 Claims. (Cl. 49—54)

This invention relates to cast refractories and a wall composed of them, particularly such refractories as are intended for resisting the attack of corrosive slags, molten glass and the like.

In a series of experiments involving such materials, we have found that the ability of the cast refractory to resist attack by corrosive molten materials varies to a considerable degree with the size and shape of the cast refractory article. In an endeavor to ascertain the cause for this difference, we have found that as between two bodies having identical chemical composition, the one having the smaller crystal sizes will have materially better slag resistance than the piece in which the crystalline grains are larger.

This has been contrary to what we would normally have expected and the following theories have been advanced to account for the phenomenon:

1. It might be an instance comparable with the case hardening of steel where the outside of the piece absorbed something from the mold material which increased its ability to resist erosion. This is, however, not borne out by examination of the piece, as there is no distinctive difference between the composition of the outside and that of the inside.

2. Where the grains were finely crystalline they were separated by microscopic layers of a matrix which was composed of a saturated glass which had more resistance to the slag than did the crystalline material. Here again, however, microscopic examination in general fails to disclose the intercrystalline matrix in significant amounts and when pieces were made having the same over-all composition as the matrix they were found to be inferior in slag resistance to the crystal constituent.

3. The difference may be due to the preferential solubility of the crystalline constituent along certain crystal axes. When the crystals are small their arrangement is in general extremely random and corrosive attack does not progress far before a crystal is encountered which presents a less favorable axis for solution. Moreover, as the material is dissolved it saturates the solvent with dissolved material and this saturated solvent remains close to and protects the adjacent material. In the case of large crystals, similar preferential solution takes place producing comparatively large pits which are not so completely filled with saturated material, and hence the slag is more readily able to attack neighboring crystals at points where their most favorable axes adjoin the area left by the original surface crystal.

All this is speculative and is offered merely for what it may be worth. The point which is certain is that, whatever the cause, smaller crystals are more resistant to slag than are the larger ones. This may be more readily seen from the following data, which were derived in the study of pieces of alumina modified by addition to the batch before fusion of about 25% of chromite ore. In such castings the crystals are corundum with chrome oxide in solid solution therein and are substantially free from intercrystalline matrix. All were of identical chemical composition and of equal height and thickness but had different widths of exposed face. These pieces were subjected to a slag test in such manner that each was subjected to exactly the same conditions. In this test the surface of the block was maintained at a temperature of 1600° C. for 100 hours and a thin uniform film of molten open-hearth furnace slag was sprayed on to the block and allowed to run down. At the conclusion of the test the thickness of the remaining piece of refractory material was measured and the depth of erosion was thus computed. The tests made in this way on a fusion of 75% alumina and 25% chromite gave the following results:

| Face width | Average crystal diameter | Average depth of erosion |
|---|---|---|
| | Mm. | Mm. |
| 2½ inches | 0.16 | 3.5 |
| 7 inches | 0.24 | 3.7 |
| 12 inches | 1.30 | 5.8 |
| 16½ inches | 1.42 | 6.3 |

The test was thereafter resumed and continued until a considerable fraction of the various blocks had been worn away. This further operation confirmed and accentuated the differences above noted.

In the larger blocks, erosion progressed faster near the centers than near the faces, which is probably attributable to the chilling effect of the molds upon the outer part of the blocks and the slower cooling of the block centers. Some gradation from one crystal size to another occurs toward the center in the larger blocks but we find that in pieces up to around 7 to 8 inches in thickness this gradation is slight and that the resistance to corrosion is high. In such thin pieces the average crystal diameter as determined by observation of micro-sections of the castings is about 0.25 mm. with both the chrome-alumina material and with material which crystallizes to form alpha corundum crystals substantially free from intercrystalline matrix. In larger pieces, produced by cooling the outer portions rapidly there is formed an outer layer perhaps 2 inches thick in which the crystal size is within the same range, while the interior crystals are much larger. Such castings show better slag resistance than those in which the crystals are large throughout, but we in general prefer to use castings not over 8 inches thick.

The results shown above have been paralleled in other compositions such as cast alumina containing minor percentages of modifying agents such as soda, silica or zircon which have been used in contact with molten glasses and the like. The characteristic dimensions of the corundum crystals in such compositions vary considerably with the amount and nature of the added ingredients, but in each series the larger blocks have larger crystals and are more rapidly eroded than the smaller ones of the same composition under like conditions.

With most alumina castings containing not over 3 to 5% of other ingredients, the maximum average crystal diameter which we have obtained is around 0.5 to 0.8 mm. and best corrosion resistance is obtained with crystals under 0.2 mm. In the specific case of beta alumina, however, much larger crystals are obtainable, plates a centimeter or more across being common in the larger castings. Here again however we prefer the finer crystalline structure of smaller castings in which the crystals are not over 0.3 mm. average diameter (this average being determined by microscopic examination of a section of the material rather than by observation of the flat faces of the crystalline plates).

In order to produce castings in which the crystals are of relatively small size we find it desirable to cool the castings as rapidly as possible to a temperature well below the range in which crystallization from the molten mass takes place. While the temperature range in question naturally varies somewhat depending upon the composition of the fusion, we find that with cast alumina and mixtures of alumina with minor percentages of other ingredients such as those mentioned above, the average temperature of the block should in general be brought down to at least 1400° C. and preferably 1200° C. as rapidly as possible. This temperature is not the minimum temperature of any portion of the casting but rather the average temperature of the entire piece.

This involves several practical difficulties as the average temperature of a piece having approximately equal dimensions in the three directions tends to remain considerably higher than the temperature of the outside of the casting, and we have found that if the temperature of the outside of the casting is allowed to drop below approximately 800° C. serious cracking almost invariably results. If, on the other hand, the temperature of the outside of the piece is maintained at materially higher values the inside of the piece does not chill sufficiently rapidly to produce the desired fine crystallization.

As a matter of practical experience, we have found that it is desirable to limit the thickness of pieces which we manufacture in this way to a maximum of about 8 inches and that such castings may be most advantageously made in metal molds. The thermal conductivity of the material being cast is of course very important in this regard since pieces of high conductivity cool throughout more readily and hence can be made somewhat thicker than pieces of lower conductivity material.

In casting pieces of such relatively small thickness care should be taken to remove the mold from around the piece before the minimum temperature of the outer face of the casting drops below 800° C., as otherwise cracking is very likely to result. The cold mold tends to withdraw heat rapidly from the casting and it has been found that the flow of heat into the mold from the outer layer of the casting is more rapid than the flow of heat from the interior of the casting to the outer layer.

In conducting our operation we take fused alumina or other material which it is desired to cast, such as magnesia-alumina or alumina-chromite mixtures, and fuse the material in an arc furnace in the manner familiar to all manufacturers of electric furnace abrasives. After a liquid fusion has been obtained and any undesirable impurities have been reduced to metal and settled out, the molten material is tapped or poured into molds fitted with suitable fonts. These molds may be made of any suitable material but we have found cast iron or other metals to be quite serviceable and inexpensive. The chilling effect of the mold is in general sufficient to insure fine crystallization when the thickness of the casting is limited to not greater than 7 to 8 inches. Fine crystallization is also assisted by vibration of the mold during the setting period or by poking the interior until such time as this becomes impossible because of freezing of the header.

Experience will show approximately how long the molds for each given size piece may be left in place without chilling the outer face of the casting unduly. When the castings have been in the molds for approximately this length of time the molds should be promptly stripped off and the castings allowed to stand in open air if need be for a short time to cool further in the case of relatively heavy pieces. The next step in any case is to protect the castings from further loss of heat either by placing them in a furnace or otherwise until the temperature of the inside and outside of the casting has had a chance to approximately equalize. This equalization should occur at a temperature range from about 900 to 1100° C. for the range of materials recited above. Thereafter the pieces should be slowly cooled at a uniform rate of perhaps about 50° C. per hour to room temperature.

Pieces made in this way may advantageously be given somewhat different handling in the construction of furnace walls from those more familiar in the art, particularly in the case of glass tanks. We have found that it is advantageous to place the castings with their narrow face presented to the molten material. Moreover vertical joints are less objectionable than horizontal ones, particularly in glass tanks and the like where little free vertical washing action occurs, so that it is recommended that castings of this sort be laid in such a manner that the narrowest face of the block is exposed and the long axis of the casting is vertical. When they are so placed the vertical joints between blocks are at least equal to, and preferably exceed in length the horizontal joints. In this way the destructive action of molten material which penetrates at the joint and then tends to eat its way upwardly through the refractory is minimized. Refractories of this type do not in any event show excessive corrosion along the joints as compared with the center of the refractory—a phenomenon distinctly different from the ordinary clay block.

The figure is a fragmentary vertical cross-section of a glass tank showing a portion of the interior face of a glass tank side wall constructed of small, narrow, vertically positioned castings according to the present invention.

In the figure the large blocks 2 shown in cross-section constitute the bottom lining of the glass tank forming the floor of the tank. In normal operation of the tank the contents of molten glass come up to the dotted line A—A, called the flux line. Below this line the blocks are constantly in contact with the molten glass. The blocks used completely above this line are generally referred to as the superstructure and do not come into direct contact with the glass. It is common practice to use small brick sized blocks for the superstructure. In the depicted wall the blocks 5 forming the superstructure are shown to be of 9" x 2½" x 4½" size with the 2½" x 9" face exposed. That portion of the wall illustrated includes one of the ports 6. The blocks 3 below the flux line which are used in direct contact with the molten glass are relatively narrow and vertically positioned in accordance with the present invention. By this positioning of the blocks the vertical joints 4 are much more numerous than the single horizontal joint 7. The blocks 3 in the glass tank illustrated are 2½" x 12" x 8" with the 2½" x 12" faces exposed.

We claim:

1. Refractory castings of long relatively narrow shape, said castings being composed principally of alumina and substantially free from intercrystalline matrix, in which castings the individual crystals are smaller than 0.25 mm. in average diameter, said castings being so positioned adjoining one another in a glass tank wall having a face exposed to molten glass that the long axes of the castings are vertical and the narrow faces of the castings are in contact with the molten glass.

2. A glass tank wall for resistance to molten glass, said wall being composed at least in part of long relatively narrow refractory castings adjoining one another and having a face width less than eight inches, said castings composed of crystalline refractory material in which the average diameter of individual crystals is less than 0.25 mm., said castings being so positioned that the long axes of the castings are vertical and the narrow faces of the castings are in contact with the molten glass.

3. A glass tank wall for resistance to molten glass, said wall being composed at least in part of long relatively narrow refractory castings adjoining one another and having a face width less than eight inches, said castings composed of a cast alumina refractory material in which the individual alumina crystals are smaller than 0.25 mm. in diameter, said castings being so positioned that the long axes of the castings are vertical and the narrow faces of the castings are in contact with the molten glass.

4. A glass tank wall for resistance to molten glass, said wall portion in direct contact with the molten glass bath being composed at least in part of long relatively narrow refractory castings adjoining one another, said castings composed substantially of corundum crystals in which the average diameter of the crystals within two inches of the faces of the castings is not over 0.25 mm.

5. A furnace wall for contact with a bath of molten flux, said wall being composed at least in part of long relatively narrow refractory castings adjoining one another, said castings being composed of crystalline refractory material in which the average diameter of individual crystals is less than 0.25 mm., said castings being so positioned that the long axes of the castings are vertical and the narrow faces of the castings are in contact with the molten bath.

6. A furnace wall for contact with a bath of molten flux, said wall being composed at least in part of long relatively narrow refractory castings adjoining one another, said castings composed of a cast alumina refractory material in which the individual alumina crystals are smaller than 0.25 mm. in diameter, said castings being so positioned that the long axes of the castings are vertical and the narrow faces of the castings are in contact with the molten bath.

RAYMOND C. BENNER.
JOHN CHARLES McMULLEN.